F. W. ROBERTSHAW & W. HOUSHOLDER.
THERMOSTATIC VALVE.
APPLICATION FILED JAN. 19, 1914.
1,194,070.
Patented Aug. 8, 1916.
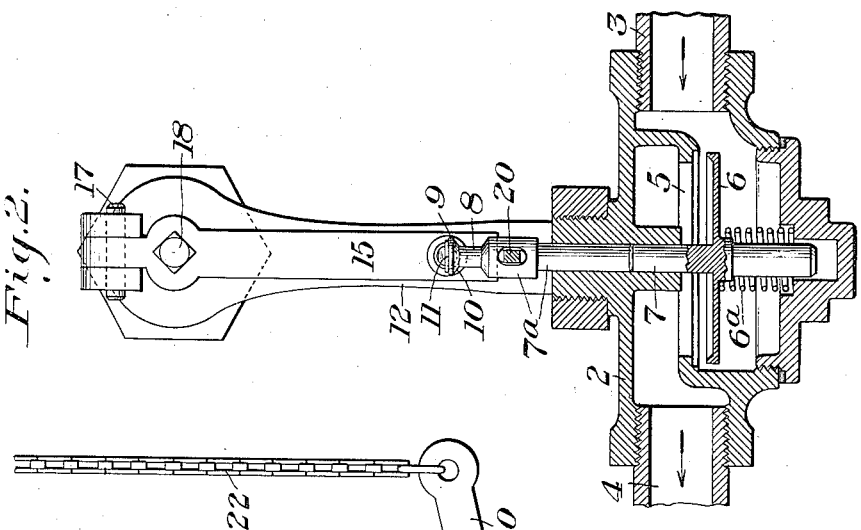
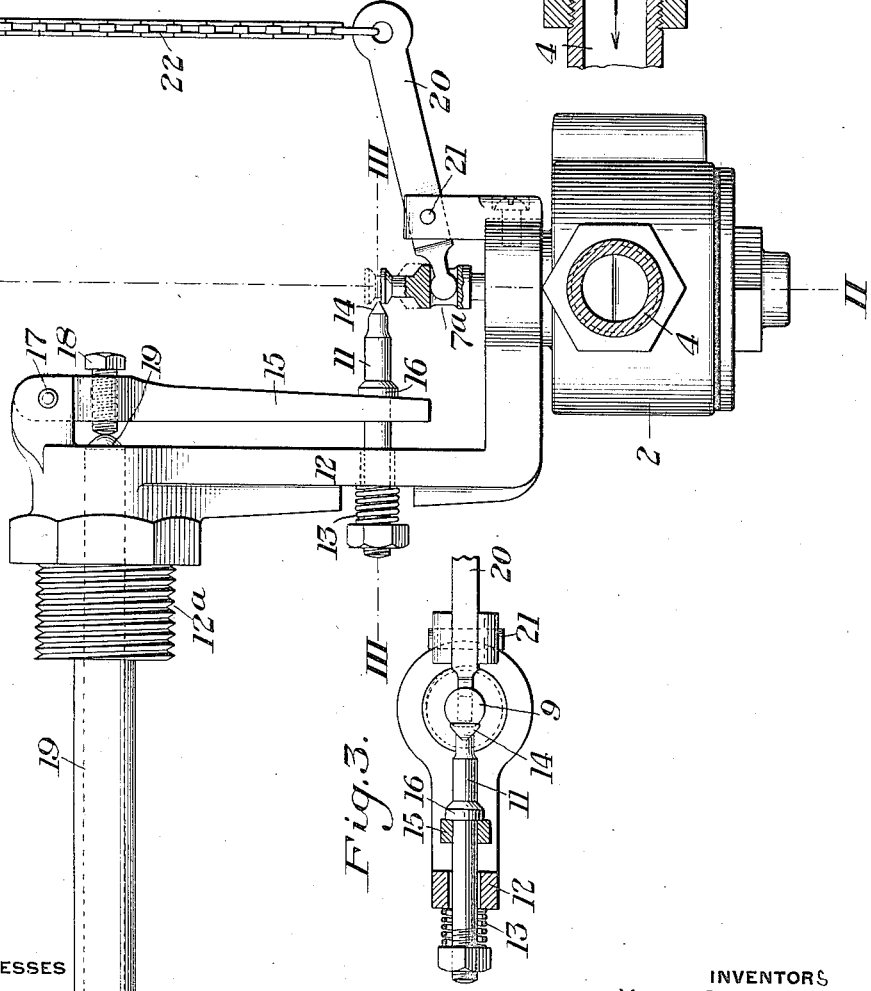
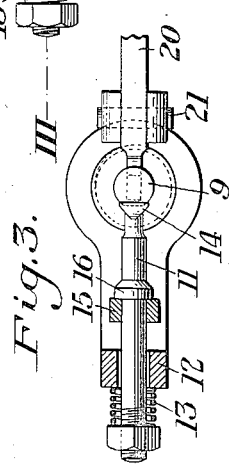
WITNESSES
INVENTORS

UNITED STATES PATENT OFFICE.

FREDERICK W. ROBERTSHAW AND WILLIAM HOUSHOLDER, OF PITTSBURGH, PENNSYLVANIA; SAID HOUSHOLDER ASSIGNOR TO SAID ROBERTSHAW.

THERMOSTATIC VALVE.

1,194,070. Specification of Letters Patent. Patented Aug. 8, 1916.

Application filed January 19, 1914. Serial No. 813,091.

*To all whom it may concern:*

Be it known that we, FREDERICK W. ROBERTSHAW and WILLIAM HOUSHOLDER, both citizens of the United States, and both residing at Pittsburgh, in the county of Allegheny and State of Pennsylvania, have invented a new and useful Improvement in Thermostatic Valves, of which the following is a full, clear, and exact description, reference being had to the accompanying drawings, forming part of this specification, in which—

Figure 1 is an elevation of a thermostatic valve device embodying our invention, and Figs. 2 and 3 are sections taken, respectively, on the lines II—II and III—III of Fig. 1.

Our invention has relation to thermostatic valves; and is designed to provide a valve device of simple and efficient character by means of which the supply of gas to a heater will be automatically shut off whenever the desired temperature is obtained at the heater. In water and other heaters, operated by gas, it is frequently desirable to operate the heater only at certain times and for relatively short periods, or until a certain temperature is reached. If the gas is allowed to burn after this temperature is reached, it is in many cases wasted.

Our invention provides valve mechanism which can be manually opened at any time to permit the flow of gas to the heater burners, and which will be automatically operated by thermostatic action to shut off the gas when the desired temperature is reached, the gas remaining shut off until the valve is again manually operated.

Referring to the accompanying drawings, in which we have shown the preferred embodiment of our invention, the numeral 2 designates a valve casing of any suitable character having the gas inlet connection 3 and the gas outlet connection 4.

5 is an interior port which is arranged to be closed by a spring pressed valve 6 carried by a stem 7. The upper portion 7a of the valve stem extends out through the casing and is provided with the reduced portion 8 terminating in the head 9 having the beveled surface 10.

11 is a pawl or dog which is slidingly mounted in a suitable bracket arm or other support 12 and which is provided with a retracting spring 13. The forward end of this pawl or dog is beveled as shown at 14 to engage the head 9 of the valve stem. When engaged with said head in the manner shown in Fig. 1 the valve 6 is held open against the tension of its closing spring 6a. The action of the retracting spring 13 is opposed by a lever arm 15 which engages a shoulder 16 on the pawl or dog 11, and which is pivoted at 17 to the bracket 12. This lever carries an adjustable contact member 18 which bears against the end of a thermostatic element 19.

20 is a lever arm pivoted at 21 and engaging the portion 7a of the valve stem. This lever is arranged to be manually actuated in any suitable manner, as by means of the pull-chain 22.

The operation is as follows: The valve 6 is normally held closed to shut off the flow of gas by the action of the spring 6a, the valve stem being in the position shown in dotted lines in Fig. 1, with the beveled end of the pawl or dog engaging the reduced portion 8 of said stem. When it is desired to open the valve and start the heater, the gas supply of which is controlled by the device, the pull-chain 22 is actuated to force the valve stem downwardly and open the valve. The beveled end of the pawl or dog rides up the beveled surface 10 of the head 9 of said stem and engages the top of said head in the manner shown in full lines in Fig. 1, thereby holding the valve open. The thermostatic element 19 is so arranged relatively to the heater as to be affected by the temperature of the substance being heated. In the case of a water heater, said element would extend into the boiler of the heater, the bracket 12 being provided with the screw-threaded portion 12a which can be screwed into the boiler at any desired point. The contact member 18 of the lever 15 is so adjusted as to prevent the spring 13 from retracting the pawl or dog 11 until such time as the desired temperature is reached. At this time the pressure of the thermostatic element against the lever 15 is decreased, permitting the spring 13 to retract the pawl or dog from its engagement with the head of the valve stem. The spring 6a then immediately closes the valve.

The advantages of our invention will be readily apparent, since it provides very simple and efficient means by which a heater can be operated for the desired period and the supply of gas then automatically cut off. The operating connections for the lever 20 can be carried to any convenient point. Thus, if the heater and valve are located in the cellar or basement of the building, the connection 22 can be carried to any desired point upstairs. A simple pull on this connection will open the valve and turn on the flow of gas to the heater. The heater is, of course, provided with the usual pilot light for igniting the gas. When the desired temperature is reached the thermostat automatically acts to cut off the flow of gas. It will be noted that the valve 6 is either fully open, or fully closed. There is therefore either a full supply of gas to the heater or no gas at all. This prevents the danger of flare-backs and improper action of the burners due to the reduction in the supply of gas thereto.

We do not desire to limit ourselves to the particular embodiment of the invention herein described, since it is obvious that any suitable form of self-closing valve may be employed; that any suitable thermostatic element may be used to release the valve and permit it to close when the desired temperature is obtained at the heater; that the valve may be arranged to be manually opened in various ways, and that other changes can be made in the construction and arrangement of the parts.

What we claim is:

1. The combination with a valve having a stem member and means normally tending to close said valve, of a manually operable lever having an actuating engagement with said stem member to open the same, said stem member having a holding portion with a beveled under surface, and a thermostatically controlled pawl having a point which is shaped and arranged to ride over said inclined surface as the valve is opened, and to then engage the said holding portion and hold the valve opened; substantially as described.

2. The combination with a valve, having automatic closing means, of manually operable means for opening said valve against the action of said closing means, the valve having an upwardly extending stem member provided with a holding surface, a reduced portion below said surface, and an inclined or beveled portion leading outwardly and upwardly from the reduced portion, and a thermostatically controlled pawl which coöperates with said holding surface to hold the valve opened and which is adapted to ride on said inclined or beveled portion; substantially as described.

In testimony whereof, we have hereunto set our hands.

F. W. ROBERTSHAW.
WM. HOUSHOLDER.

Witnesses:
Geo. B. Bleming,
Geo. H. Parmelee.

Copies of this patent may be obtained for five cents each, by addressing the "Commissioner of Patents, Washington, D. C."